(12) United States Patent
Jacobsen

(10) Patent No.: US 10,289,883 B2
(45) Date of Patent: *May 14, 2019

(54) METHOD OF IDENTIFICATION OF AN ITEM USING PHASE DATA FOR MOVEMENT DETECTION

(71) Applicant: LYNGSOE SYSTEMS A/S, Aars (DK)

(72) Inventor: Klaus Holst Jacobsen, Aars (DK)

(73) Assignee: LYNGSOE SYSTEMS A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/542,809

(22) PCT Filed: Jan. 14, 2015

(86) PCT No.: PCT/DK2015/050007
§ 371 (c)(1),
(2) Date: Jul. 11, 2017

(87) PCT Pub. No.: WO2016/112910
PCT Pub. Date: Jul. 21, 2006

(65) Prior Publication Data
US 2018/0004991 A1    Jan. 4, 2018

(51) Int. Cl.
*G06K 7/10* (2006.01)
*G01S 13/74* (2006.01)
(Continued)

(52) U.S. Cl.
CPC .......... *G06K 7/10435* (2013.01); *G01S 13/74* (2013.01); *G01S 13/84* (2013.01);
(Continued)

(58) Field of Classification Search
CPC .................... G06K 7/10435; G01S 11/026
See application file for complete search history.

(56) References Cited

U.S. PATENT DOCUMENTS 6,967,579 B1 * 11/2005 Elizondo ................. B64F 1/368
340/572.1
9,213,873 B2 * 12/2015 Austin ............... G06K 7/10108
(Continued)

FOREIGN PATENT DOCUMENTS

| EP | 2154552 A1 | 2/2010 |
| EP | 2533173 A1 | 12/2012 |

OTHER PUBLICATIONS

International Search Report PCT/DK2015/050007; 4 pgs.
Written Opinion PCT/DK2015/050007; 6 pgs.

*Primary Examiner* — Thomas Randazzo
(74) *Attorney, Agent, or Firm* — Schmeiser, Olsen & Watts, LLP

(57) ABSTRACT

A method and system for identification of an item is provided, wherein the system includes a conveyor belt, a conveyor belt controller and a reader operable to receive at least one reading from at least one tag attached to the item and extract from the reading a measurement of the phase of the signal transmitted by the tag and received at at least one antenna of the reader, the antenna being adapted to be arranged at a read point along the conveyor belt, wherein the conveyor belt controller is configured to start the conveyor belt at a first time instant, after the item has been placed on the conveyor belt, and to stop the conveyor belt at a second time instant, when the item has passed the antenna of the reader whereby the identification of the item is accomplished.

10 Claims, 3 Drawing Sheets

Figure 1:
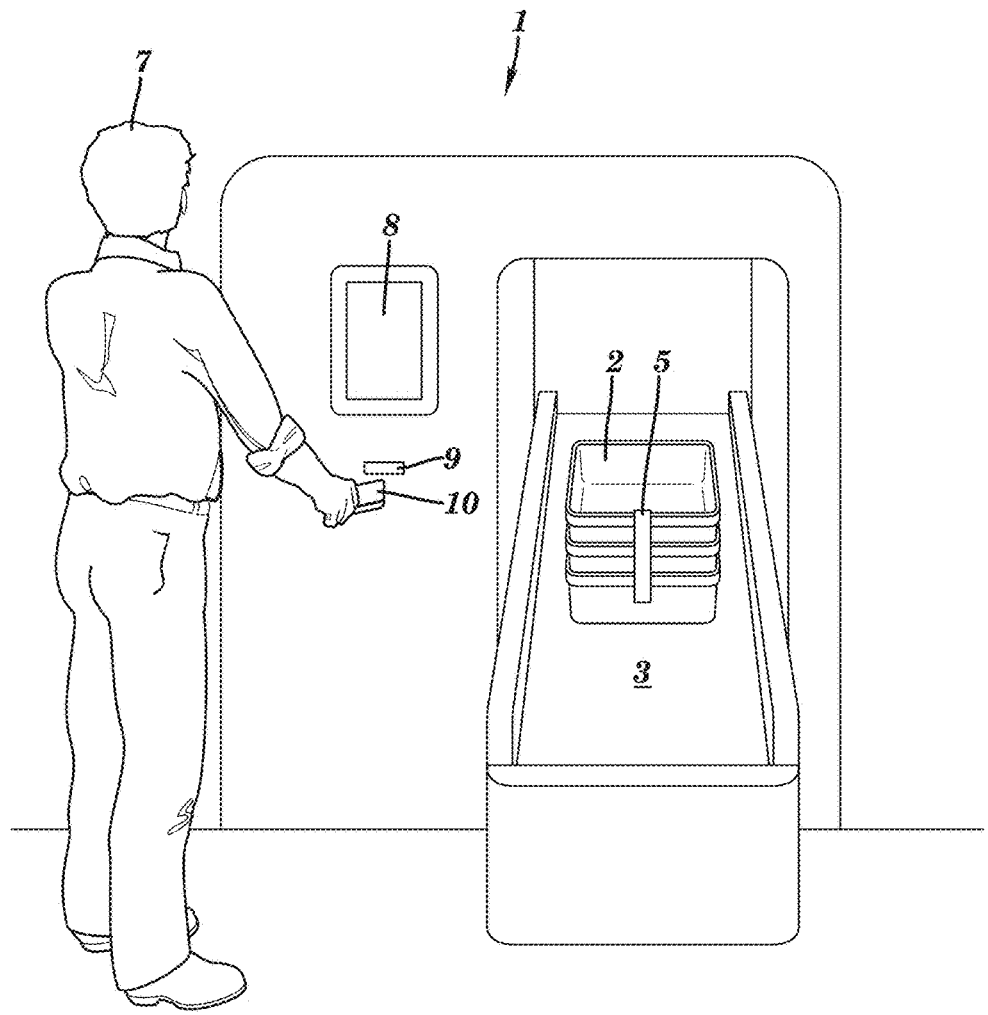

(51) Int. Cl.
  *G01S 13/84* (2006.01)
  *G05B 19/05* (2006.01)
  *G01S 11/02* (2010.01)

(52) U.S. Cl.
  CPC ......... *G05B 19/05* (2013.01); *G06K 7/10079* (2013.01); *G06K 7/10445* (2013.01); *G01S 11/026* (2013.01); *G05B 2219/15117* (2013.01)

(56) References Cited

U.S. PATENT DOCUMENTS

| | | | |
|---|---|---|---|
| 9,898,633 B2* | 2/2018 | Bottazzi | G06K 7/10435 |
| 2006/0212164 A1* | 9/2006 | Abraham, Jr. | G06K 17/00 700/215 |
| 2007/0030150 A1 | 2/2007 | Mullins | |
| 2009/0066484 A1* | 3/2009 | Mochizuki | G06K 7/0008 340/10.51 |
| 2010/0109903 A1* | 5/2010 | Carrick | G01S 5/14 340/8.1 |
| 2010/0328073 A1* | 12/2010 | Nikitin | G01S 5/0247 340/572.1 |
| 2012/0022684 A1* | 1/2012 | Hernot | B64F 1/368 700/225 |
| 2013/0201003 A1* | 8/2013 | Sabesan | G01S 7/42 340/10.1 |
| 2014/0197926 A1* | 7/2014 | Nikitin | G06K 7/10009 340/10.1 |
| 2015/0114802 A1* | 4/2015 | Talbot | B65G 43/00 198/810.01 |
| 2015/0286849 A1* | 10/2015 | Stimming | G01S 3/781 340/10.41 |

\* cited by examiner

METHOD OF IDENTIFICATION OF AN ITEM USING PHASE DATA FOR MOVEMENT DETECTION

CROSS-REFERENCE TO RELATED APPLICATIONS

This application claims priority to PCT Application No. PCT/DK2015/050007 having a filing date of Jan. 14, 2015, the entire contents of which is hereby incorporated by reference.

FIELD OF TECHNOLOGY

The following relates to the technical field of item identification, particularly to item identification based on signal phase measurements.

BACKGROUND

Item identification may be performed, for example, in case of self-service bag drop stations at airports by means of a hand scanning, which is used by the passenger or the airport clerk to scan the barcode printed on the bag tag. The controller of the conveyor belt then knows that the piece of luggage on the conveyor belt is associated to that bag tag and thereby is able to track the bag along its journey until it reaches its final destination within the airport premises. The drawback of this solution is that passengers often overlook the presence of a hand scanner and sometimes even do not know how to use it. Also, since it is a user-driven process, the time consumed to perform the hand scanning action is unpredictable and may be very long.

Another known solution is to utilize a housing where the passenger places his suitcase. The housing closes and the scanning takes place. The housing is closed on three sides from metal panels and on its rear side from the conveyor belt, which during the scanning stands vertically; thus, the housing behaves like a Faraday cage. Consequently, the scanner only detects the bag tag attached to the suitcase placed inside the housing. After the identification has taken place, the conveyor belt tilts until it gets to a horizontal position and the suitcase is transported away from the housing. The drawback of this solution is that it is very time consuming and requires a plurality of purpose-made housings, each containing an abundance of sensors, actuators and motors, which are all prone to error. Also, the scanning cannot be correctly performed if some gaps are left through which the signal can propagate, as otherwise the system could potentially scan bag tags that are not attached to the suitcase inside the housing and associate one of them to the suitcase.

Hence, there is a long-felt need in the technical field of item identification of overcoming the abovementioned drawbacks of the state-of-the-art solutions.

SUMMARY

An aspect relates to an improvement to the state-of-the-art. The second aspect of the invention is to solve the aforementioned drawbacks of the known art by providing an easy and fast solution that requires minimal user intervention, without the need for expensive apparatuses or complex processes such as the use of a hand scanner.

The aspects of the embodiments of the invention are achieved by a system for identification of an item (e.g., a suitcase, a bag, a package, etc.), wherein the system comprises a conveyor belt, a conveyor belt controller (e.g., a PLC) and a reader (e.g., an RF reader such as an RFID reader) operable to receive at least one reading from at least one tag (e.g., a self-adhesive label embedding an RFID tag) attached to the item (e.g., at the handle of a suitcase) and extract (e.g., by means of signal processing techniques) from the reading a measurement of the phase (e.g., an estimate of the phase change over time) of the signal (e.g., an RF signal) transmitted by the tag and received at at least one antenna of the reader, the antenna (e.g., an RFID antenna) being adapted to be arranged at a read point along the conveyor belt (e.g., underneath the topside and/or at one or both lateral sides of an opening of a wall, a gate, a portal, etc. through which the conveyor belt runs), wherein the conveyor belt controller is configured to start the conveyor belt (e.g., the PLC activates the motor of the conveyor belt) at a first time instant, after the item has been placed on the conveyor belt (e.g., after a countdown of a few seconds), and to stop the conveyor belt (e.g., the PLC deactivates the motor of the conveyor belt for a few seconds) at a second time instant, when the item has passed the antenna of the reader, the first and second time instants defining a time window, wherein the reader is configured to associate the tag to the item if the pattern of the phase measurements of the tag before, within and after the time window (i.e., substantially constant, variable and substantially constant, respectively) corresponds to the pattern of the movement of the item on the conveyor belt (i.e., static, in movement and static, respectively), whereby the identification of the item (i.e., the association of the tag to the item and consequently to the travel information of the passenger) is accomplished.

Herein, "RFID" is referred to any technology that uses RF signals for communication and/or identification purposes such as UHFGen2.

Herein, "substantially constant" is referred to the fact that the phase measurements can fluctuate when the item is still, but on average they remain constant over time.

A reading may, for example, comprise: the time when the signal has been received at the reader (i.e., the timestamp), the received signal strength indicator (RSSI), the phase value of the received signal and information about the communication channel. As well as the RSSI, the derivative of the phase value provides information on the change in distance between the antenna and the item.

Embodiments of the invention have the following advantages: (i) it is independent of the signal strength; (ii) it does not result in any misidentification error, even if it reads tags not only from the item being scanned; (iii) it is an automated process with minimum, if none, user intervention; (iv) it requires no shielding as for the known solution based on the Faraday cage; and (v) it is very precise and reliable.

RSSI may be used to determine which tag is attached to the item. However, the latter is a very unreliable type of measurement, which depends on numerous factors such as the propagation environment, the quality of the tag and the antenna, the consistency in the quality of the tag, etc. Theoretically, the power of the reader could be even increased up to its maximum in order to get as many measurements for the same item as possible (e.g., 3-4 m before/after the read point) while not influencing the retrieved phase values. If RSS measurements would be used, instead, the higher the power of the reader the more difficult would be to filter the data and perform the identification. Hence, embodiments of the invention have the additional advantage of enabling more accurate item identification while being able to increase radio emissions for better signal reception.

Advantageously, the antenna of the reader may be placed with an equal distance from a first position of the item at the first time instant and a second position of the item at the second time instant, so as to maximize the probability of reading the tag both when the tag is static before moving and when the tag is static again after having passed the read point. Moreover, the antenna may be arranged so as to be as close as possible to the items moving past it, whereby the readings retrieved by the antenna have the highest received signal strength possible. Therefore, RSSI may be used in combination with embodiments of the invention in order to filter the phase measurements, for example, by discarding phase measurements with a received signal strength under a threshold (e.g., −55 dBm).

Note that, in case the phase measurements of a tag do not change but remain constant during the time window, the system can infer that the tag is not moving and is not attached to the item (e.g., if it has fallen on the floor by the side of the conveyor belt). The system would then be able to filter out those tags not matching the movement pattern of the item. Hence, embodiments of the invention has the further advantage of enabling the detection of such situations and, optionally, of subsequently alerting the user (e.g., a passenger) or an operator (e.g., an airport clerk).

In an advantageous embodiment of the invention, the reader may be configured to compare the phase measurements to a threshold. The phase values may fluctuate when the item is static, thus this embodiment enables the system to determine if the item has in fact moved or is still. Advantageously, readings may be split according to three phases: (1) the static phase before the item starts moving (e.g., about 2 sec); (2) the movement phase from when the item has started moving until it has moved past the antenna (e.g., about 2 sec); and (3) the stop phase after the item has passed the antenna (e.g., about 2 sec). The accumulated phase change is calculated for these three phases. The tag is then considered to be still, for example, if its accumulated phase change is below a first threshold and it is considered to be moving if the accumulated phase change is above a second threshold—the fluctuation of the phase measurements (e.g., due to an obstacle in-between the item and the antenna or to the tag vibrating under the effect of an air stream) in fact falls within a range. For instance, the first threshold may be within the range 50-100 degrees (e.g., 75 degrees) and the second threshold may be within the range 100-200 degrees (e.g., 150 degrees). Note that the definition of the above thresholds may depend on the reader in use, etc. Finally, if the tag is considered to be still while the item is still (phases 1 and 3) and moving when the item is moving (phase 2), the system concludes that the tag is on the item.

In an advantageous embodiment of the invention, the system further comprises a detector (e.g., a positioning means such as a photocell or a weighing means such as a weight or a pressure sensor) for detecting that the item has been placed on the conveyor belt. The advantage of this embodiment is that the conveyor belt controller is thereby triggered to start the conveyor belt without any intervention by the user (e.g., tabbing on a touch screen or pushing a button). For example, a passenger can simply place his luggage on the conveyor belt and leave. Hence, the system enables maximum time and cost efficiency, both for the user and the operator.

Advantageously, another unit in the system (e.g., a local server) rather than the reader may perform the extraction of the phase measurements from the readings and/or the association of the tag to the item and/or the comparison of the phase measurements to the threshold and/or the data processing.

Also, the aforementioned aspects of the embodiments of the invention are achieved by a method of identification of an item, wherein the method comprises:
  providing a system as described above;
  the reader receiving one or more readings from the tag;
  the reader extracting the phase measurements from the readings;
  the conveyor belt controller starting the conveyor belt at a first time instant, after the item has been placed on the conveyor belt;
  the conveyor belt controller stopping the conveyor belt at a second time instant, when the item has passed the antenna of the reader, the first and second time instants defining a time window; and
  the reader associating the tag to the item if the pattern of the phase measurements of the tag before, within and after the time window corresponds to the pattern of the movement of the item on the conveyor belt;
  whereby the identification of the item is accomplished.

In an advantageous embodiment of the invention, the method further comprises the reader comparing the phase measurements to a threshold.

In an advantageous embodiment of the invention, the method further comprises the detector detecting that the item has been placed on the conveyor belt.

Note that the steps of the method do not necessarily need to be carried out in the order described above but may also be performed in a different order and/or simultaneously.

Note that all the aforementioned advantages of the system are also met by the method described above.

BRIEF DESCRIPTION

Figure 2:
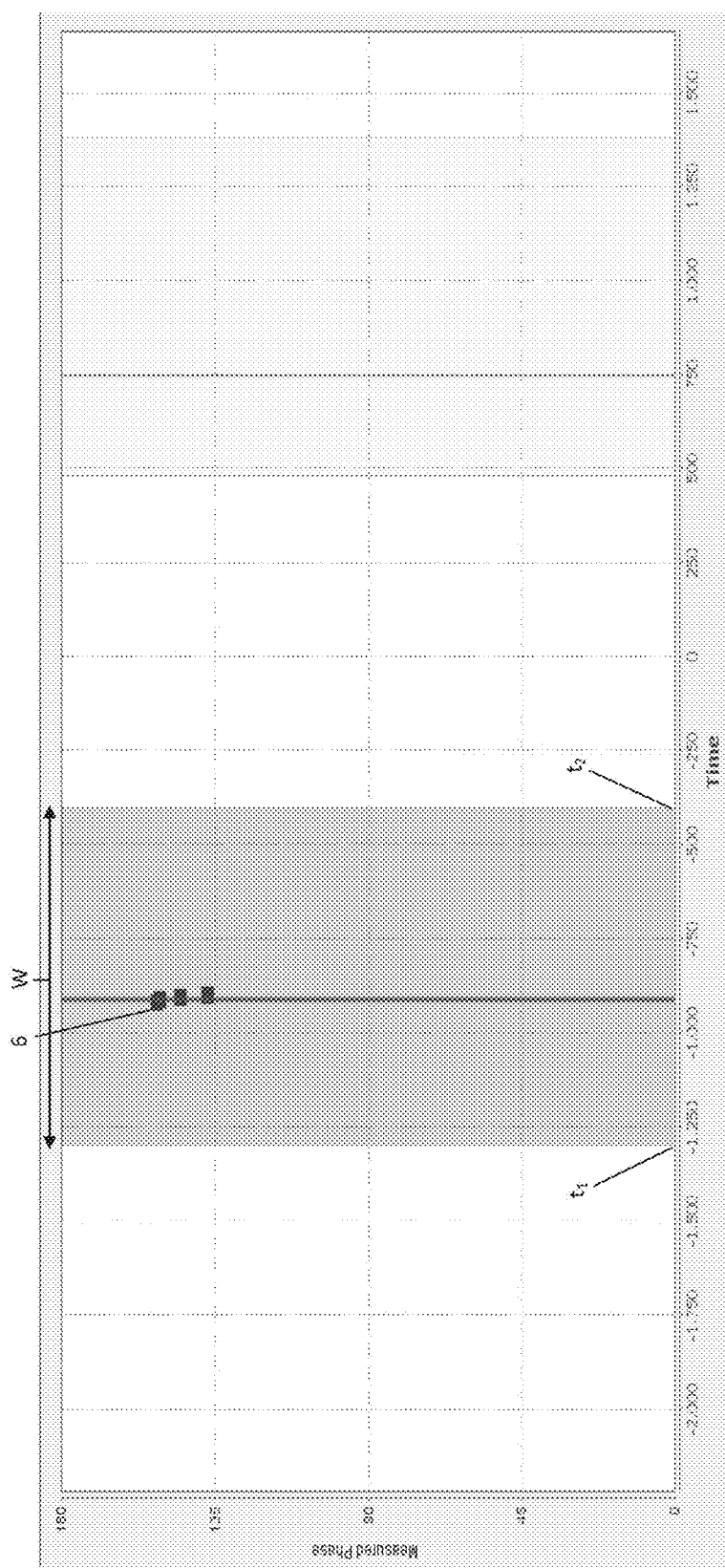

Some of the embodiments will be described in detail, with reference to the following figures, wherein like designations denote like members, wherein:

FIG. 1: depicted is a top view of a self-service bag drop unit;

FIG. 2: depicted is a snapshot of phase measurements plotted against time; and

Figure 3:
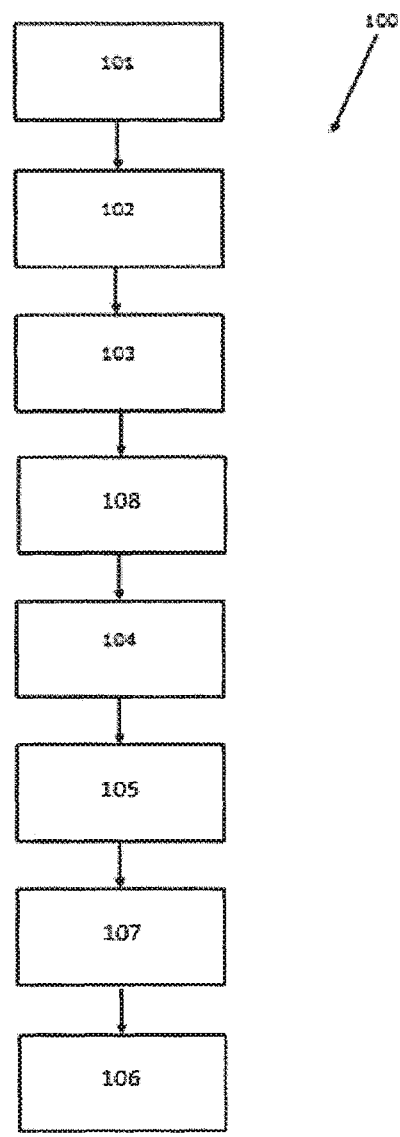

FIG. 3: depicted is a method of item identification according to embodiments of the invention.

NOTATIONS

1: Self-service bag drop unit.
2: Item.
3: Conveyor belt.
4: Read point.
5: Tag.
6: Measurement.
7: Passenger.
8: Display.
9: Optical scanner.
10: Boarding card.
$t_1$: First time instant.
$t_2$: Second time instant.
W: Time window.

DETAILED DESCRIPTION

FIG. 1 shows an advantageous embodiment of a system 1 for identification of an item 2 in the form of a self-service bag drop unit 1. Note, however, that the system 1 of embodiments of the invention is not limited to be used as a self-service bag drop unit 1 within airport premises, but can also be used for other applications such as in a postal distribution central or a retail distribution center for sorting packages.

The passenger 7 simply checks-in as usual (e.g., at a check-in kiosk), applies the bag tag 5 embedding an RFID tag to his bag 2 (in this example, the bag is simply a security tray) and moves towards the self-service bag drop unit 1 where he finally places his bag 2 on the conveyor belt 3.

The passenger 7 may then interact with a display 8 (e.g., a touch screen), which may, for example, visualize messages such as: "Do you want to check-in your bag?". When the passenger 7 validates the request (e.g., by tabbing the message on the touch screen), the PLC activates the motor of the conveyor belt 3 and the bag 2 is directed towards the read point 4 (e.g., positioned a few meters from the area where the passenger 7 had originally placed his bag 2) under which the bag 2 is stopped again. At the topside of the read point 2 sits an RFID antenna of an RFID reader, which scans all the bag tags 5 in its coverage. Subsequently, the reader identifies which bag tag 5 sits on that bag 2 and sends a feedback to the self-service bag drop unit 1. The passenger 7 may then be asked to confirm that the bag 2 that has just been read is in fact his bag 2 (e.g., by letting an optical scanner 9 read the barcode on his boarding card 10 or by tabbing a "YES" message on the display 8). Afterwards, the bag 2 is checked-in and is transported away from the read point 4, for example, by being transferred to a second conveyor belt.

The printer at the check-in codes the relevant information in the RFID tag, which is printed together and embedded in the bag tag 5 to apply to the bag 2. The 10 digits code, which is encoded in the barcode on the bag tag 5, is also encoded in the RFID tag via the RFID antenna at the printer.

A PLC (Programmable Logic Controller) is a low level controller, which makes the conveyor belt 3 run/stop and which tracks the bags 5 by means of photocells positioned along the conveyor belt 3.

FIG. 2 shows measured phase values 6 in degrees against time in ms for the bag tags 5 under coverage of the reader during time. The time interval depicted in grey represents the time window W, which defines when the bag 2 started to move on the conveyor belt 3 (ref vertical line on the left-hand-side of the time window W) and when the bag 2 stopped under the antenna of the reader (ref vertical line on the right-hand-side of the time window W). It is noticeable that: (i) the phase values 6 remain substantially constant before the time window W; this is due to the fact that the passenger 7 had placed the bag 2 on the conveyor belt 3 and had, for example, spent time interacting with the self-service bag drop unit 1; (ii) the phase values 6 change within the time window W; this is due to the fact that the bag 2 moves on the conveyor belt 3; and (iii) the phase values 6 remain substantially constant after the time window W; this is due to the fact that the bag 2 is stopped under the antenna of the reader (e.g., the bag 2 may be stopped for around 2 sec in order to get some readings and in order to give a result back to the self-service bag drop unit 1).

The conveyor belt controller may inform the self-service bag drop unit 1 of the time instant $t_1$ when the bag 2 started to move on the conveyor belt 3 and the time instant $t_2$ when the bag 2 stopped under the antenna of the reader. If the self-service bag drop unit 1 determines that the bag tag 5 was static in the time interval before the time window W (e.g., from when a weight detected the bag 2 on the conveyor belt 3), that the bag tag 5 moved within the time window W and that the bag tag 5 was static again in a time interval after the time window W, it concludes that the bag tag 5 is associated to that bag 2. In other words, the self-service bag drop unit 1 checks which bag tag 5 has a pattern corresponding to that of the bag 2 on the conveyor belt 3 and accordingly performs the association bag tag-bag.

For instance, in case the passenger 7 has another bag 2 standing on the side of the conveyor belt 3 while he checks-in his first bag 2, the phase values 6 retrieved by the self-service bag drop unit 1 will substantially be constant for that bag tag 5 along the entire time. Therefore, the self-service bag drop unit 1 will conclude that that bag tag 5 is not associated to the bag 2 that has gone through the read point 4 and will filter it out. Similarly, if another passenger 7 walks by with a bag 2, the phase values 6 associated to that bag tag 5 will constantly vary during time, thus permitting to the self-service bag drop unit 1 to filter out also that bag tag 5.

FIG. 3 shows a method 100 of identification of an item 2, wherein the method 100 comprises:

providing 101 a system 1 as described above;

the reader receiving 102 one or more readings from the tag 5;

the reader extracting 103 the phase measurements 6 from the readings;

the detector detecting 108 that the item 2 has been placed on the conveyor belt 3;

the conveyor belt controller starting 104 the conveyor belt 3 at a first time instant $t_1$, after the item 2 has been placed on the conveyor belt 3;

the conveyor belt controller stopping 105 the conveyor belt 3 at a second time instant $t_2$, when the item 2 has passed the antenna of the reader, the first and second time instants $t_1$, $t_2$ defining a time window W;

the reader comparing 107 the phase measurements 6 to a threshold; and the reader associating 106 the tag 5 to the item 2 if the pattern of the phase measurements 6 of the tag 5 before, within and after the time window W corresponds to the pattern of the movement of the item 2 on the conveyor belt 3;

whereby the identification of the item 2 is accomplished.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of identification of an item in a system, the system comprising:
    a conveyor belt,
    a conveyor belt controller,
    a reader comprising an antenna, the antenna being arranged at a read point along the conveyor belt and configured for receiving a signal transmitted from a tag, the reader being operable to receive at least one reading from the tag via the antenna and extract from the reading a measurement of the phase of the signal transmitted by the tag and received by the antenna of the reader,
wherein the method comprises:
    placing an item on the conveyor belt;

by the conveyor belt controller starting the conveyor belt at a first time instant $t_1$ after the item has been placed on the conveyor belt;

by the conveyor belt controller stopping the conveyor belt at a second time instant $t_2$, when the item has passed the antenna of the reader, the first and second time instants $t_1$, $t_2$ defining a time window W;

by the reader receiving multiple readings from the tag before t1, multiple readings in the time window W, and multiple readings after t2 in order for the readings spanning over the time window and outside the time window and extracting signal phase measurements from the readings before, in and after the time window W; and by the reader associating the tag to the item if the pattern of the phase measurements of the tag comprises changing phase values within the time window and substantially constant phase values before and after the time window W corresponding to the movement of the item on the conveyor belt only within the time window whereby the identification of the item is accomplished.

2. The method according to claim 1, wherein the system comprises a self-service bag drop unit and wherein the method comprises by the conveyor belt controller informing the self-service bag drop unit of the time instant when the item started to move on the conveyor belt and the time instant when the item stopped under the antenna of the reader; by the self-service bag drop unit associating the tag to the item if the tag is found to have moved within the time window W but has been static in time intervals before and after the time window.

3. The method according to claim 1, wherein the tag is an RFID tag, and the antenna is an RF antenna, and wherein the method comprises transmitting signals by the tag and reading the signals by the antenna.

4. The method according to claim 1, wherein the method comprises defining three periods, of which the first period is before the time window W, the second period is within the time window until the tag has passed the antenna, and the third period is after the time window; wherein the method further comprises by the reader calculating an accumulated phase change for each period and comparing the phase measurements to a first and a second threshold and further considering the tag to be still if the accumulated phase change is below a first threshold and considering the tag to be moving if the accumulated phase change is above a second threshold.

5. The method according to claim 4, wherein the method comprises setting the first threshold within the range of 50-100 degrees and the second threshold within the range of 100-200 degrees.

6. The method according to claim 1, wherein the system comprises a detector for detecting that the item has been placed on the conveyor belt; the method further comprising by a detector detecting that the item has been placed on the conveyor belt and as a consequence of the detection, by the conveyor belt controller starting the conveyor belt without intervention by a user.

7. The method according to claim 6, wherein the detector comprises a photocell or a weight or a pressure sensor, and wherein the method comprises detecting by the photocell or weight or pressure sensor that the item has been placed on the conveyor belt.

8. The method according to claim 1, wherein the method comprises providing a reading that comprises a timestamp for receipt of the signal from the tag, a signal strength indicator (RSSI) for the signal, the signal phase value of the signal, and information about a communication channel for the signal.

9. The method according to claim 8, wherein the method comprises providing a signal strength threshold and discarding phase measurements when a received signal has a strength under the signal strength threshold.

10. The method according to claim 1, wherein the item is a suitcase, or a bag, or a package, and the method comprises identifying the item in an airport.

\* \* \* \* \*